(12) United States Patent
Qiyu et al.

(10) Patent No.: US 9,731,521 B2
(45) Date of Patent: Aug. 15, 2017

(54) PAPER LEVEL MEASUREMENT

(71) Applicant: International Business Machines Corporation, Armonk, NY (US)

(72) Inventors: Chiang Qiyu, Singapore (SG); Dhanalakshmi Sundaram, Singapore (SG); Seng K. Koh, Singapore (SG); Christ Lestario, Singapore (SG); Francisco Deligero Liwa, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/744,514

(22) Filed: Jun. 19, 2015

(65) Prior Publication Data

US 2015/0286912 A1 Oct. 8, 2015

Related U.S. Application Data

(62) Division of application No. 13/483,165, filed on May 30, 2012.

(51) Int. Cl.
| | |
|---|---|
| *B41J 11/00* | (2006.01) |
| *B65H 7/20* | (2006.01) |
| *B65H 43/02* | (2006.01) |
| *G06K 15/00* | (2006.01) |
| *B65H 26/06* | (2006.01) |

(52) U.S. Cl.
CPC ............ *B41J 11/009* (2013.01); *B65H 7/20* (2013.01); *B65H 26/06* (2013.01); *B65H 43/02* (2013.01); *G06K 15/4065* (2013.01); *B65H 2511/11* (2013.01); *B65H 2511/114* (2013.01); *B65H 2511/512* (2013.01); *B65H 2701/12422* (2013.01)

(58) Field of Classification Search
CPC ... B41J 29/46; B41J 29/48; B41J 11/46; B41J 11/42; B41J 11/0075; B41J 11/0095; B65H 2301/41522; B65H 2301/4152; G06K 15/4065
USPC ... 242/159, 160.2, 160.4, 563, 563.1, 563.2, 242/912
See application file for complete search history.

(56) References Cited

U.S. PATENT DOCUMENTS

| | | | |
|---|---|---|---|
| 5,803,635 | A | 9/1998 | Austin et al. |
| 6,068,209 | A * | 5/2000 | Nakamura ........... B65H 23/063 242/160.1 |
| 6,252,673 | B1 | 6/2001 | Miyasaka et al. |
| 6,282,807 | B1 | 9/2001 | Johnson |

(Continued)

OTHER PUBLICATIONS

ND69 Modular POS Printer User Guide, Jul. 2000.
List of IBM Patents or Applications Treated as Related, Jun. 2015.

*Primary Examiner* — Sang Kim
*Assistant Examiner* — Nathaniel Adams
(74) *Attorney, Agent, or Firm* — Lieberman & Brandsdorfer, LLC (57) ABSTRACT

Detecting a continuous level of paper in a paper supply providing paper for a printing device. A length of the paper supply includes applied indicia, with the indicia extend contiguously across the length of the paper supply. When a paper section is dispensed, the position of the indicia on the dispensed portion of paper is determined, with the position reflecting a level pertaining to the paper supply remaining or dispensed.

7 Claims, 7 Drawing Sheets

(56) References Cited

U.S. PATENT DOCUMENTS

| | | |
|---|---|---|
| 6,661,979 B2 | 12/2003 | Barlow |
| 6,688,791 B2 | 2/2004 | Otsuki |
| 8,011,844 B2 | 9/2011 | Yada et al. |
| 2004/0184858 A1 | 9/2004 | Maruyama |
| 2008/0142631 A1 | 6/2008 | Vorhees |
| 2008/0162057 A1 | 7/2008 | Bongrazio et al. |

* cited by examiner

PAPER LEVEL MEASUREMENT

CROSS REFERENCE TO RELATED APPLICATION(S)

This application is a divisional patent application claiming the benefit of the filing date of U.S. patent application Ser. No. 13/483,165 filed on May 30, 2012 and titled "Paper Level Measurement", which is hereby incorporated by reference.

BACKGROUND

Technical Field

The present invention generally relates to a system to detect a level of paper in a paper supply available for printing in a printing device. More specifically, the level of paper in the supply that has been used or is remaining is measured in a continuous manner.

Description of the Prior Art

In a printing device using paper supplied from a paper supply, printing is carried out by successively feeding the paper supply to a printing position. When one printing job is finished, the used paper is subjected to cutting and/or separation from the paper supply. The size of a print image on the used paper may respectively differ for each print job. Accordingly, a shortage in a remaining amount of the paper supply may occur for a successive print job, causing a print interrupt.

To prevent interruption in the operation of the printing device due to no paper available for printing, it is known to use a detector to sense a low paper condition. One solution is to employ an encoder to measure the cumulative length of paper available for printing. Another solution uses a detecting arm which loses contact with an exterior circumferential surface of the paper roll when the paper roll reaches a "near end" state. Some known solutions provide the printing device with a signal indicative of the paper level. In response to the signal, the printing device indicates the low paper level condition to a user through a light emitting diode or a similar illumination device.

Known solutions detect only arbitrarily-defined paper "low" conditions and provide only a few discrete states of paper level, such as "Full," "Near Empty," and "Empty." These solutions fail to indicate precise levels of paper during printing process and are limited to detecting a predefined number of discrete states of paper level. The transition from one state to another may be unexpected and sudden. In addition, most of the solutions are highly dependent on electronics. Paper level cannot be measured once electrical power is cut off. Accordingly, there is a need for an accurate measurement of a paper supply.

SUMMARY OF THE INVENTION

A system is provided for continuously measuring a paper level associated with a paper source.

In one aspect, the system measures a paper level associated with a paper source and dynamic application of the measured level. The system includes a processing unit in communication with memory, and a sensor in communication with the memory. The sensor is employed to read a position of indicia on a paper supply. A functional unit is provided in communication with the memory. More specifically, the functional unit includes a tool to manage the paper supply, and the processing unit communicates with the functional unit to process information received from the tools. The tools include, but are not limited to, a position manager and a director. The position manager is in communication with the sensor and functions to receive information regarding the position of the indicia from the sensor and to assess a quantity of the paper supply. The quantity includes a remaining supply of paper or a consumed supply of paper. The director, which is in communication with the position manager, functions to dynamically control dispensing of paper from the paper supply.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention unless otherwise explicitly indicated. Implications to the contrary are otherwise not to be made.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional unit described in this specification has been labeled with tools, directors, and/or managers. The functional unit may be implemented in programmable hardware devices such as field programmable gate arrays, programmable array logic, programmable logic devices, or the like. The functional unit may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of an identified functional unit need not be physically located together, but may comprise disparate instructions stored in different locations which, when joined logically together, comprise the functional unit and achieve the stated purpose of the functional unit.

Indeed, a functional unit of executable code could be a single instruction, or many instructions, and may even be distributed over several different code segments, among different applications, and across several memory devices. Similarly, operational data may be identified and illustrated herein within the functional unit, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of modules, managers, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the scope of the present invention.

In a printing device using a paper supply, printing is carried out by successively feeding the paper supply to a printing position. Printing of one print job includes application of indicia to a surface of the paper. A print job may only require a select length of paper. When the print job is completed, a used section of the paper is subject to separation from the supply. In one embodiment, the used section may be separated from the used paper with applied indicia from a remaining length of paper in the paper supply that may be used for a subsequent print job. Similarly, in one embodiment, each used section may include a preset length of paper, and the preset length is separated from the paper supply. For example, the paper supply may be form based with each form having a defined length. In another embodiment, the size of a print image may respectively differ for each printing job, thereby affecting the length of paper that has been used and similarly the length of paper that remains unused.

Figure 1:
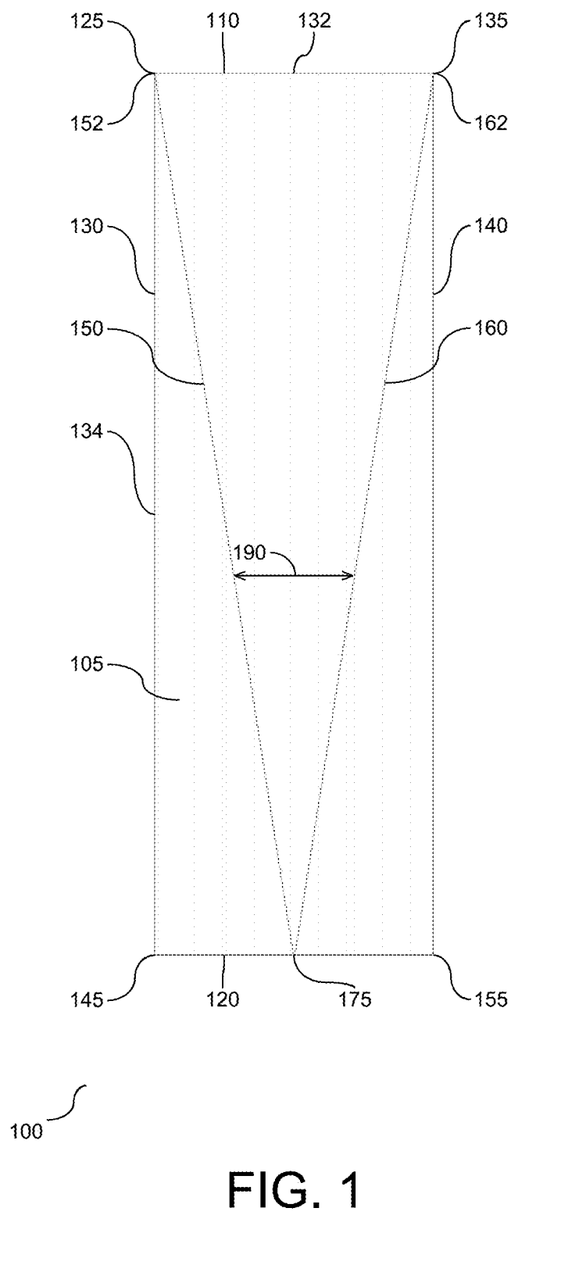
FIG. 1 is a diagram showing an extended length of paper with a V-shaped line applied to a surface of the paper.

FIG. 1 is a diagram (100) illustrating an embodiment of extended length of paper (105) used for a printing device (not shown). The extended length of paper (105) is shown as a rectangular shape, although the shape of the length of paper should not be limited to the geometric shape shown herein. The extended length of paper (105) is shown and described herein as a rectangular shape having four corners (125), (135), (145), and (155) and four sides (110), (120), (130), (140). Sides (110) and (120) are oppositely disposed and maintain a parallel or near parallel alignment. Similarly, sides (130) and (140) maintain a parallel or near parallel alignment. Sides (110) and (120) maintain a perpendicular or near perpendicular alignment to sides (130) and (140). The paper (105) is shown extended and planar. In one embodiment, the paper (105) may be wound around a roller or a shaft. Regardless of the alignment, the paper supply is a single continuous length of paper or a stack of paper supply. Accordingly, the paper (105) has a continuous planar length employed with a printer to apply indicia to a fixed medium of the paper (105).

One of the pair of sides represents the width of the paper and another pair of the sides represents the length of the paper. For purposes of description, sides (130) and (140) are described herein to represent the length (134) of the paper (105), and sides (110) and (120) are described herein to represent the width (132) of the paper (105). Indicia are provided on a surface of the paper (105) and are represented as two lines (150) and (160). More specifically, side (110) and (130) meet to form a first corner at (125), side (110) and (140) meet to form a second corner at (135), side (140) and (120) meet to form a third corner at (145), and side (140) and (110) meet to form a fourth corner at (155). A first of the two lines (150) is shown to extend from the first corner (125) to a point (175) between the third and fourth corners (145) and (155), respectively. In one embodiment, point (175) is a midpoint between the third and fourth corners (145) and (155) on side (120). A second of the two lines (160) is shown to extend from the second corner (135) to the point (175) between the third and fourth corners (145) and (155). Accordingly, the two lines (150) and (160) extend in a continuous matter from side (110) to side (120).

By way of example and not limitation, the lines (150) and (160) may be made of a magnetic material, infrared sensitive ink, or ultraviolet sensitive ink. The lines (150) and (160) may be visible or invisible to a user, depending on the implementation. In one embodiment, an image sensor (not shown) may be provided in communication with lines (150) and (160). At the end of each printing job when a section of the length of paper (105) is dispensed, the sensor measures the position of the lines (150) and (160) with respect to the sides of the non-dispensed or dispensed portion of the length of paper (105). More specifically, a length of the paper remaining or a length of the paper used may be determined from the position of the lines (150) and (160) to the respective sides (130) and (140). In one embodiment, the length of the paper remaining or length of paper used may be determined from the distance (190) remaining between the lines (150) and (160). A starting position (152) of line (150) is shown at the first corner (125), and a starting position (162) of line (160) is shown at the second corner (135). The distance (190) between the two line lines (150), (160) at the starting positions (152), (162), respectively, is a maximum distance corresponding to the distance between the first corner (125) and the second corner (135). The distance (190) continuously decreases in a linear manner across the length of the lines (150) and (160). When the lines (150) and (160) meet at (175), the distance (190) converges, e.g. forms a narrowing gap, between the two lines (150) and (160) which disappear when the lines (150) and (160) converge. Accordingly, the distance (190) between the two lines and the linear correspondence of the distance to the length of paper may be employed to assess the remaining length of paper in a corresponding supply.

The lines (150) and (160) and the distance (190) formed there between may be assessed by a person or machine, depending on the format of the lines. If the lines (150) and (160) are visible to the human eye, a person may assess the remaining length of paper. However, if the lines (150) and (160) are not visible to the human eye, a sensor may be employed to assess the remaining length of paper. In one embodiment, a computing device is provided in communication with the sensor to interpret the measured position of the lines (150) and (160) in terms of a paper level in the supply used for the printing device. The calculated paper level is reported to an operator of the associated printing device. For example, if a minimum length of paper remains, the report of the calculated level may dictate a requirement for a new paper source to be employed.

Figure 2:
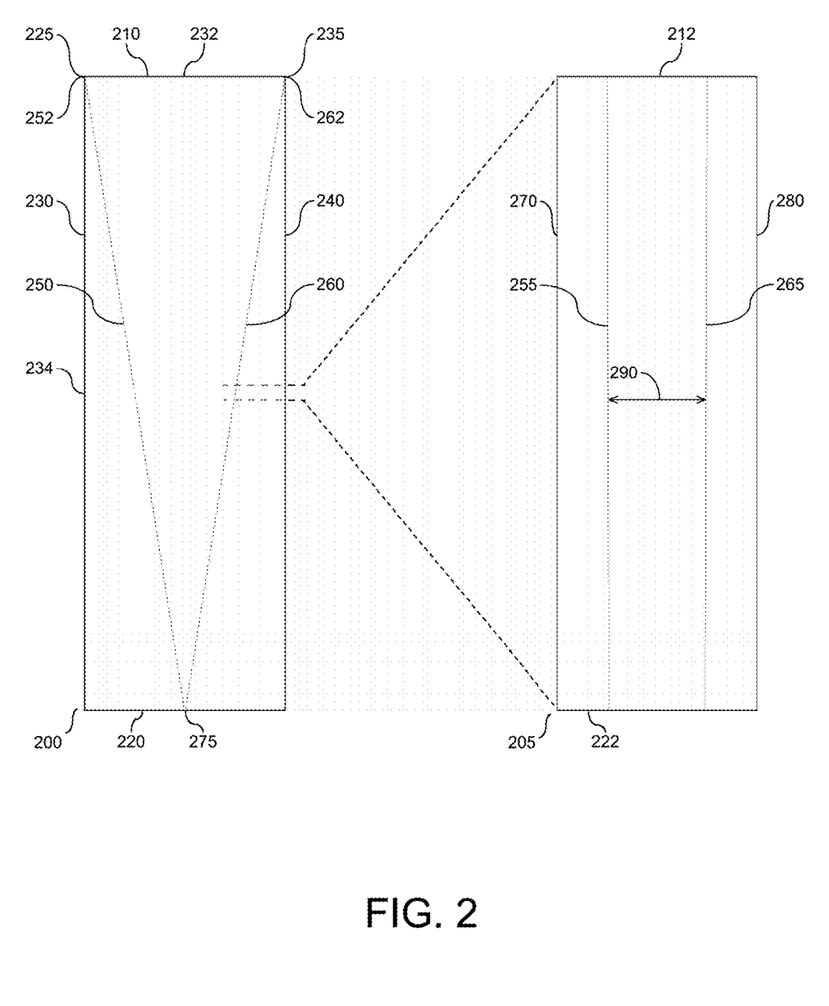
FIG. 2 is an exploded view of a dispensed section of paper from the extended length of paper with V-shaped line applied to a surface of the paper.

As noted above, the paper source employs a continuous length of paper, which has a finite length. When printing of one job is finished, the paper is subjected to separation from the supply at or near a position adjacent to the indicia applied to the paper by the associated print job. The section of the paper with indicia is dispensed, and the remaining length of paper is retained in the paper source. FIG. 2 is an exploded view (200) of the dispensed section of paper from FIG. 1 with the exploded view illustrating a section of the paper that has been separated from the continuous length. Based on the relationship of FIGS. 1 and 2, similar identification elements will be shown with similar numerals. As described above in FIG. 1, the length of paper dispensed has a V-shaped line applied to the surface of the paper. These lines may be visible or near-visible to the human eye, with the intent that the lines do not affect the integrity of presentation of indicia on the paper. A dispensed section (205) is shown in the shape of a rectangle taken from the extended supply (200). In one embodiment, the shape of the section (205) may be in a different form, and as such, the scope should not be limited to the specific shape described herein. Accordingly, the following description pertains to a dispensed section of paper from the continuous length.

In the extended supply (200) with markings to show a position from which the dispensed section (205) is taken, a starting position (252) of line (250) is shown at the first corner (225), and a starting position (262) of line (260) is shown at the second corner (235). A distance between the two line lines (250), (260) at the starting positions (252), (262), respectively, is a maximum distance corresponding to the distance between the first corner (225) and the second corner (235). This distance continuously decreases in a linear manner across the length of the lines (250) and (260), until the distance converges, e.g. forms a narrowing gap, between the two lines (250) and (260) which disappear when the lines (250) and (260) converge. The dispensed section (205) is shown with lines (250) and (260) disposed on the surface of the paper. More specifically, the dispensed section (205) is described herein as a rectangular shape having four sides (212), (222), (270), and (280). Sides (212) and (222) of the dispensed section (205) are oppositely disposed and maintain a parallel or near parallel alignment. Similarly, sides (270) and (280) are oppositely disposed and maintain a parallel or near parallel alignment. Sides (212) and (222) maintain a perpendicular or near perpendicular alignment to sides (270) and (280), respectively. The dispensed paper section (205) is shown extended and planar.

One of the pair of sides represents the width of the dispensed paper section (205) and another pair of the sides represents the length of the dispensed paper section (205). For purposes of description, sides (212) and (222) are described herein to represent the width (232), and sides (270) and (280) are described herein to represent the length (234) of the dispensed segment. Different sections of dispensed paper may have different or the same length. Regardless of the length of paper dispensed, the width (212), (222) is the same for all sections severed from the length of the paper source.

Lines (255) and (265) shown on the dispensed paper (205) represent sub-segments of lines (250) and (260), respectively. Specifically, line (250) originates at side (210) and extends toward side (220), and line (260) originates at side (220) and extends toward side (210). Extrapolating lines (255) and (265) across the entire length of the paper would show lines (250) and (260) meeting at (275) along edge (220). In the sample severed section of paper (205), lines (255) and (265) are shown to be nearly parallel to each other and to the sides (270) and (280) of the dispensed paper (205). This relationship of the lines (255) and (265) demonstrates that the dispensed paper (205) is about the mid-section of the entire paper source. In one embodiment, as the dispensed segment nears the end of the paper sources, the distance (290) between lines segments (255) and (265) will decrease, indicating that the paper source is nearly depleted. Conversely, in one embodiment, a non-parallel relationship between line segments (255) and (265) that diverge demonstrates that the paper source has greater than fifty percent of the supply remaining. Accordingly, the paper supply remaining is based on the distance between the line segments on the dispensed paper.

As shown, the distance (290) between the lines (255) and (265) is defined by the position of the dispensed paper segment (205) with respect to the paper remaining in the paper source. There are three manners in which the measurement of lines (255) and (265) take place. A first measurement is the distance between lines (255) and (265), a second measurement is a distance between line (255) and edge (270), and a third measurement is a distance between line (265) and edge (280). Any or all of the first, second, and third measurements may be employed as a basis to determine the quantity of paper remaining in the paper source.

Any one of the three measurements with respect to the position of lines (250) and (260) as described above may take place via machine or a manual assessment. In the case of a line that is visible to the human eye, the manual assessment may be employed to determine if the lines (255) and (265) are converging, and if so, how close they are to convergence. Similarly, in one embodiment, an image sensor (not shown) may be provided to measure any one of, or a combination of, the three distance measurements described above. With respect to the image sensor, a computing device or controller is provided in communication with the sensor to interpret the measured position of the lines (255) and (265) in terms of the paper level available for use. The measured position of the paper level may be reported to the printing device. Since lines (250) and (260) form a V shaped marking, each of the three defined measurements determine the position of lines (255) and (265) for each dispensed paper section (205) is indicative of the paper level available for printing or consumed in the printing device. Accordingly, the system as described above provides for a continuous measurement of the paper level, as opposed to reporting a few discrete levels.

Figure 3:
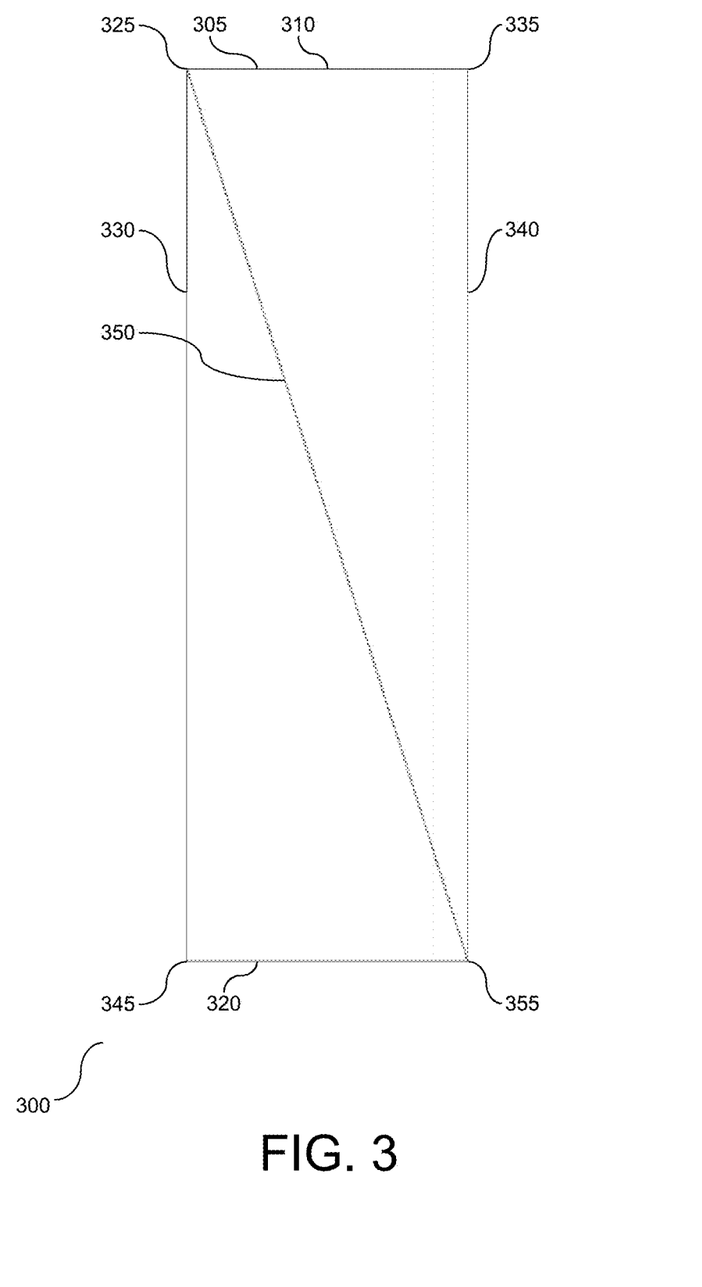
FIG. 3 is a diagram showing an extended length of paper roll with a diagonal line applied to a surface of the paper.

FIG. 3 is a diagram (300) illustrating an extended length of paper (305) used for a printing device (not shown) according to a first embodiment. The extended length of paper (305) is shown as a rectangular shape, although the shape of the length of paper should not be limited to the geometric shape shown herein. The extended length of paper (305) is shown and described herein as a rectangular shape having four corners (325), (335), (345), and (355) and four sides (310), (320), (330), (340). Sides (310) and (320) are oppositely disposed and maintain a parallel or near parallel alignment. Similarly, sides (330) and (340) maintain a parallel or near parallel alignment. Sides (310) and (320) maintain a perpendicular or near perpendicular alignment to sides (330) and (340). The paper (305) is shown extended and planar. In one embodiment, the paper (305) may be wound around a roller as a continuous length. Accordingly, the paper (305) has a continuous planar length employed with a printer to apply indicia to a fixed medium.

One of the pair of sides represents the width of the paper and another pair of the sides represents the length of the paper. For purposes of description, sides (330) and (340) are described herein to represent the length of the paper (305), and sides (310) and (320) are described herein to represent the width of the paper (305). Indicia are provided on a surface of the paper (305) and represented as a single line (350). More specifically, side (310) and (330) meet to form a first corner at (325), side (310) and (340) meet to form a second corner at (335), side (340) and (320) meet to form a third corner at (345), and side (340) and (310) meet to form a fourth corner at (355). The single line (350) is shown to extend from the first corner (325) to the fourth corner (355). In one embodiment, the line (350) may be a single straight or near-straight line that extends continuously between two oppositely position corners of the extended length of paper. Accordingly, the line (350) is a single line that extends between two oppositely positioned corners to form a diagonal line across the extended paper length.

Figure 4:
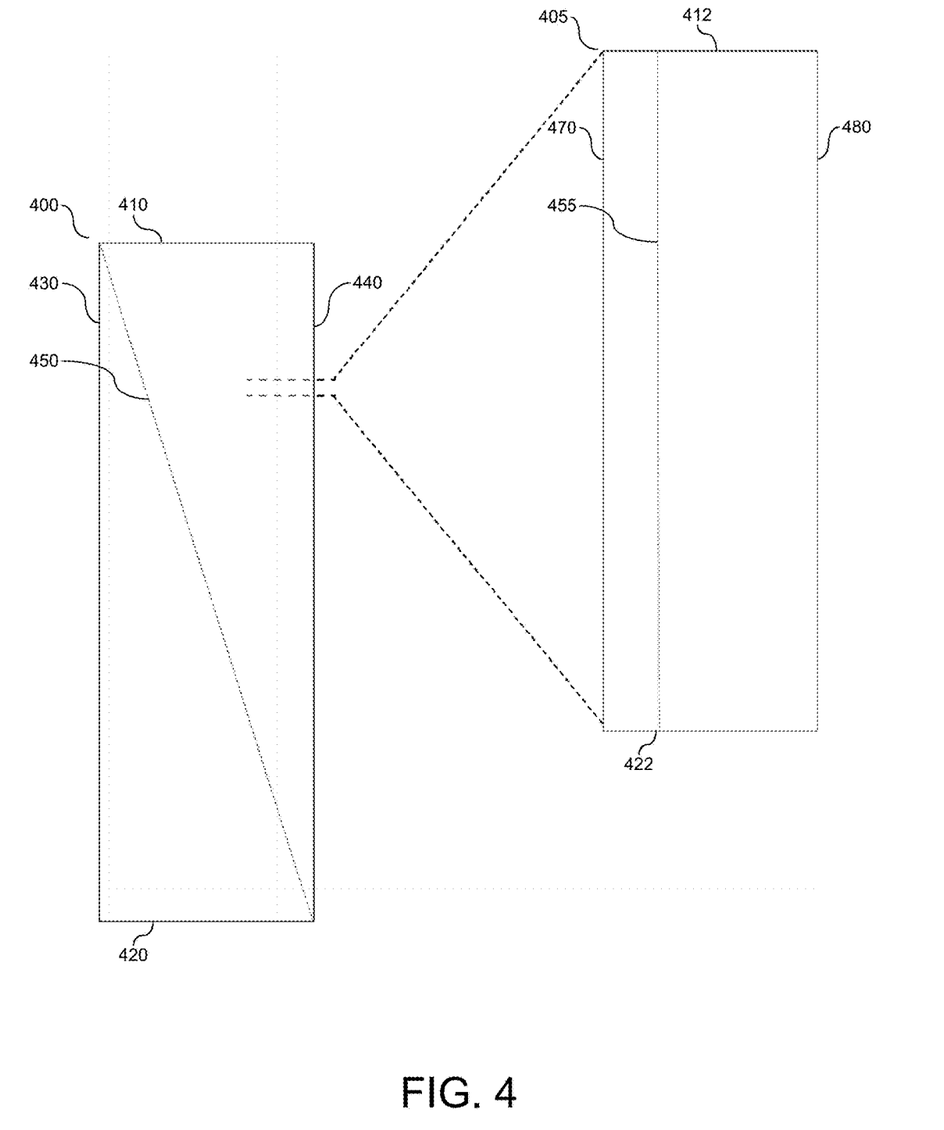
FIG. 4 is an exploded view of a dispensed section of paper from the extended length of paper with the diagonal line applied to a surface of the paper.

FIG. 4 is a block diagram (400) illustrating a segment of paper that has been separated from the continuous length. Based on the relationship of FIGS. 3 and 4, similar identification elements will be shown with similar numerals. When a print job is finished, the length of paper is subjected to being separate from the paper supply at a position following the end of the applied indicia, and then a portion of the length of paper is dispensed. As described above in FIG. 3, the length of paper dispensed has a single continuous line applied to the surface of the paper. This line may be visible or near-visible, with the intent that the line does not affect the integrity of the presentation of indicia on the paper. A dispensed section (405) is shown in the shape of a rectangle. Similarly a non-dispensed section (400) is shown with markings to illustrated the location of the dispensed section from the extended supply. However, in one embodiment, the shape of the section (405) may be in a different form, and as such, the scope should not be limited to the specific shape described herein. Accordingly, the following description pertains to a dispensed section of paper from the continuous length.

The dispensed section (405) is shown with line (455) disposed on the surface of the paper. More specifically, the dispensed section is described herein as a rectangular shape having four sides (412), (422), (470), and (480). Sides (412) and (422) of the dispensed section (405) are oppositely disposed and maintain a near parallel alignment. Similarly, sides (470) and (480) are oppositely disposed and maintain a parallel or near parallel alignment. Sides (412) and (422) maintain a perpendicular or near perpendicular alignment to sides (470) and (480), respectively. The dispensed paper section (405) is shown extended and planar.

One of the pair of sides represents the width of the dispensed paper section (405) and another pair of the sides represents the length of the dispensed paper section (405). For purposes of description, sides (412) and (422) are described herein to represent the width, and sides (470) and (480) are described herein to represent the length of the dispensed segment. Different sections of dispensed paper may have different or the same length. Regardless of the length of paper dispensed, the width is the same for all sections separated from the length of the paper source.

Line (455) shown on the dispensed segment of paper (405) represents a sub-segment of the entire line (450). Specifically, in the non-dispensed supply (400) line (450) originates at side (410) and extends toward side (420). In the sample severed section of paper (405), line (455) is shown to be closer to side (470) than side (480). The distance from the line (455) to any one of sides (470) and (480) reflects the position of the dispensed paper (405) with respect to the entire paper source. In one embodiment, as the dispensed segment nears the end of the paper sources, the linear distance between line segment (455) and side (470) will increase, indicating that the paper source is nearly depleted. Accordingly, the paper supply remaining is based on the characteristics associated with line (455) together with the distance measurement between the line segment (455) on the dispensed paper section to any one of the oppositely positions sides (470) and (480).

There are two manners in which the measurement of the position of line (455) takes place. A first measurement is the distance between line (455) and side (470), and a second measurement is a distance between line (455) and side (480). Any or all of the first and second measurements may be employed as a basis to determine the quantity of paper remaining in the paper source.

Any one of the two measurements with respect to the position of line (455) as described above may take place via machine or a manual assessment. In the case of a line that is visible to the human eye, the manual assessment may be employed to determine the position of the line (455) with respect to any one of the sides.

Figure 5:
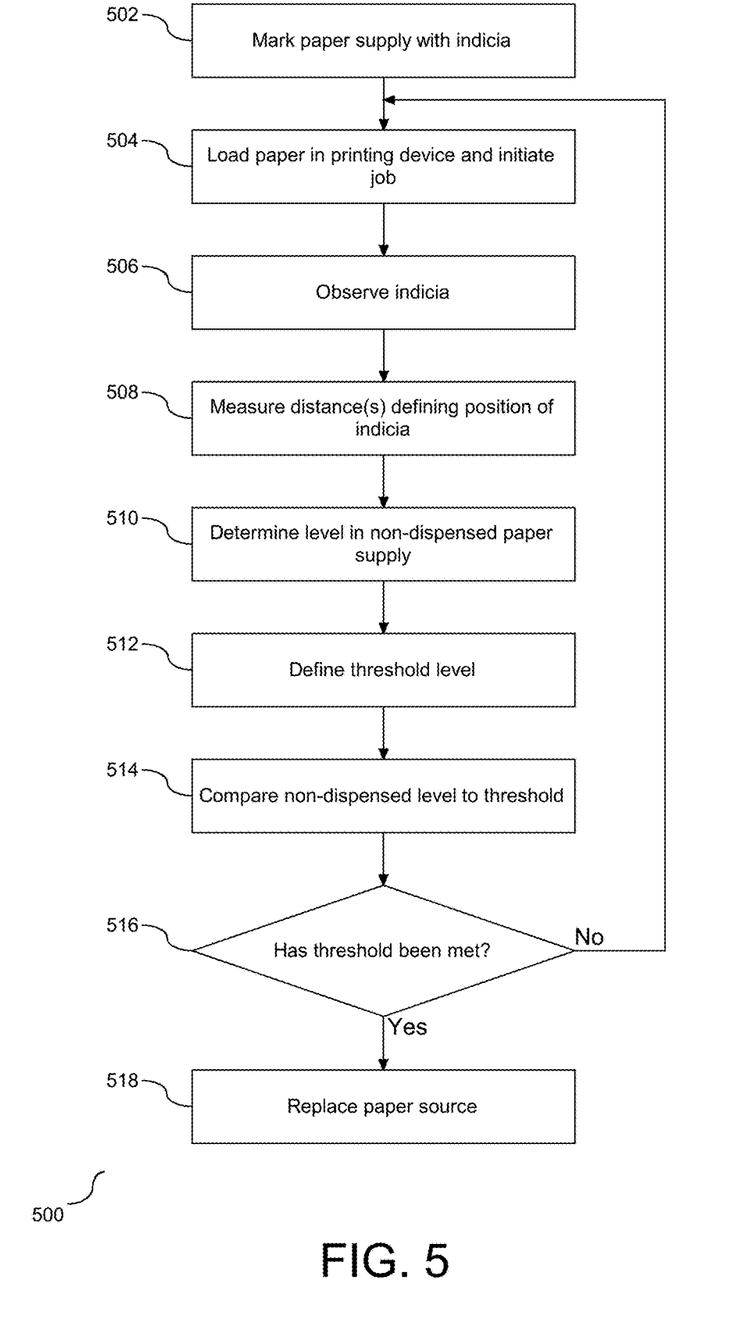
FIG. 5 is a flow chart illustrating a method for measuring a paper level used or remaining in an extended length of paper supply.

FIG. 5 is a flowchart (500) illustrating a method for determining a paper level in a continuous length of paper according to the present invention. As described above, the length of paper in the paper supply is marked with indicia extending from a first end of the paper to a second end (502). In one embodiment the indicia includes a single line starting from a first corner adjacent to the first end of the roll paper and extending to second corner opposite to the first corner and adjacent to a second end of the paper. In another embodiment, the indicia may include two lines, a first line starting from a first corner adjacent to the first end of the paper and a second line starting from a second corner adjacent to the first end. Both, the first and the second lines extend to the middle point of the second end, e.g. with two lines intersect at a meeting point on an oppositely positioned side of the paper from the starting points of the two lines. Regardless of the embodiment of the configuration of the indicia employed, the indicia are continuous across the length of the paper.

The paper with embedded indicia is loaded in a printing device and a printing job is initiated (504). When a paper section of the roll paper is dispensed, the position of the indicia reflecting a level of the paper is observed (506). One or more distances defining the position of the indicia with respect to the sides of the dispensed paper section are measured (508), and the measurement(s) is used to determine the paper level in the non-dispensed portion of the paper source (510). In one embodiment, the paper level is reported to a user. In yet another embodiment, the user visually determines the level of paper based upon the position of the indicia. A threshold level identifying a position near the end of the paper source is defined (512). Following the reporting at step (510), the non-dispensed paper level of the paper source is compared to the defined threshold (514), and it is determined if the threshold has been attained (516). A positive response to the determination at step (516) is followed by replacing the paper source with a new paper source (518). Conversely, a negative response to the determination at step (516) is followed by a return to step (504) to proceed to the next print job. Accordingly, measurement of the indicia following the print job together with the comparison with the threshold comparison ensures that the printer has enough paper to service the next print job.

Figure 6:
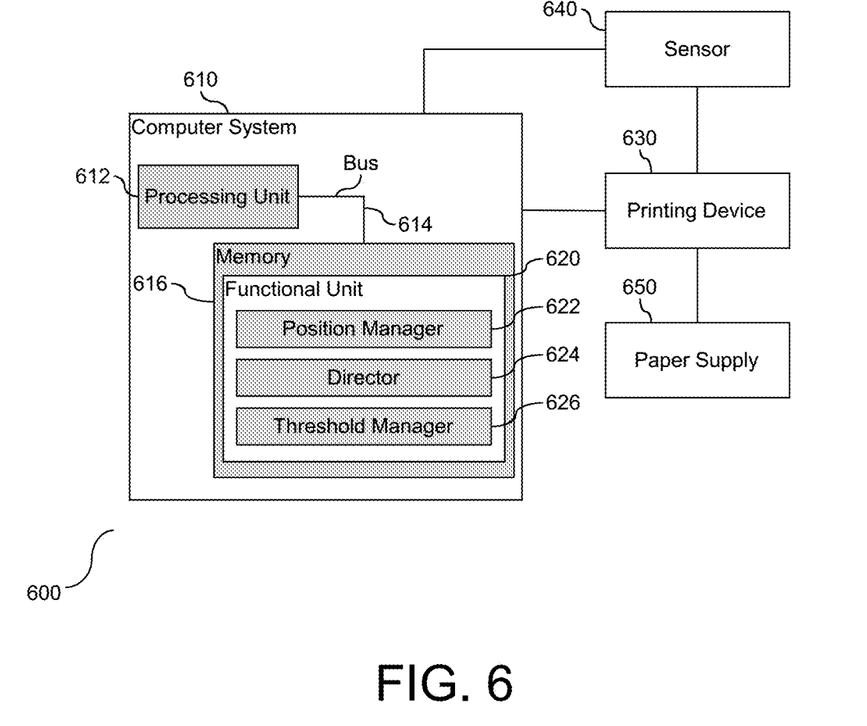
FIG. 6 is a block diagram illustrating tools embedded in a system to support dynamic assessment of the paper supply.

As demonstrated in FIG. 5, a series of steps may be employed to assess the quantity of paper remaining in the paper source. FIG. 6 is a block diagram (600) illustrating tools embedded in a system to support assessment of the dispensed paper. For illustrative purposes, a computer system (610) is provided in communication with a printing device (630). The computer system (610) is provided with a processing unit (612) in communication with memory (616) across a bus (614). The computer system (610) is shown in communication with a sensor (640). In one embodiment, the sensor (640) may be a part of or in communication with the printing device (630). A functional unit (620) is provided in communication with memory (616); the functional unit (620) supports management of the paper source.

The sensor (640) functions in communication with the paper supply (650), and more specifically to read a position of indicia on the paper supply. The indicia are a specific continuous element in communication with the paper supply (650). In one embodiment, the indicia are in the form of a straight line between two points. The functional unit (620) is shown herein with several tools for management of the paper supply (650). Specifically, the tools include, but are not limited to, a position manager (622), a director (624), and a threshold manager (626). The position manager (622) is in communication with the sensor (640), and receives indicia position data from the sensor (622). Based upon the indicia position data, the position manager (622) assesses a quantity of paper associated with the paper supply (650). The quantity includes a remaining supply of paper and a consumed amount of the supply of paper. More specifically, the quantity reflects how much paper has been used or how much paper remains. The director (624) is provided in communication with the position manager (622). The director (624) functions to dynamically control dispensing of paper from the paper supply based on the quantity of paper supply assessed by the position manager (622). Accordingly, the position manager (622) and director (624) function to assess the position of the sensed indicia and to employ this position data to manage the supply of paper (650).

As shown and described in FIGS. 1-5, the paper supply (650) is a continuous paper source. In one embodiment, the paper supply may be spaced about a roller or shaft, and as a portion of the paper is dispensed, this portion is separated from the continuous length of the paper supply (650). The paper supply (650) is a single continuous length of paper marked with indicia that extends continuously across the paper from a first end of the paper to a second end of the paper. The indicia may come in different forms and configurations, and should not be limited to the forms and configurations described herein. For example, the indicia may be a single line that extends from a first corner adjacent to the first end and to an opposite corner of the second end, or the indicia may consist of two beveled lines including a first of the two lines starting from the first corner adjacent to the first end and a second of the two lines starting from an oppositely positioned second corner of the second end. The line, single or plural, may be beveled. It is the position of the single line with respect to any of the edges of the paper, or in the case of the two lines the position of the lines with respect to each other or to any of the edges of the paper that are indicative of the supply of paper remaining or used.

The sensor (640) is provided in communication with the tools (622) and (624) of the functional unit (620). More specifically, the sensor (640) functions to read a position of the indicia on a dispensed portion of the paper supply (650) and to measure a distance of the indicia from an edge of the dispensed paper. The distance measured defines the level of the paper in the paper supply (650). In addition to tools (622) and (624), the functional unit (620) includes a threshold manager (626) to compare the level of the dispensed paper against a defined threshold. The threshold as defined provides a basis for the measurement. The threshold manager (626) communicates the compared level to the director (624), which communicates a signal to a printing device (630) in communication with the paper supply. The signal functions as a dynamic communication tool to provide an authorization to the printing device (630) with respect to a print job. More specifically, the signal communicates that there is a sufficient amount of paper in the paper supply (650) to print a successive print job, or there is not a sufficient amount of paper remaining in the paper supply (650) and as such, the paper supply (650) needs a replacement paper supply. Accordingly, as shown herein, tools are provided to assess a paper supply level, and dynamically communicate the assessment to ensure a sufficient quantity of paper supply for a successive print job.

As identified above, the position manager (622), director (624), and threshold manager (626), hereinafter referred to as tools, function as elements to dynamically assess and control the paper supply. The tools (622)-(626) are shown residing in memory (616) local to the computing device (610). However, the tools (622)-(626) may reside as hardware tools external to the memory (616), or they may be implemented as a combination of hardware and software. Similarly, in one embodiment, the tools (622)-(626) may be combined into a single functional item that incorporates the functionality of the separate items. As shown herein, each of the tools (622)-(626) are shown local to the computing device (610). However, in one embodiment they may be collectively or individually distributed across a network or multiple machines and function as a unit to dynamically assess and manage a paper supply. Accordingly, the tools may be implemented as software tools, hardware tools, or a combination of software and hardware tools.

As will be appreciated by one skilled in the art, aspects of the present invention may be embodied as a system, method or computer program product. Accordingly, aspects of the present invention may take the form of an entirely hardware based embodiment, an entirely software based embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
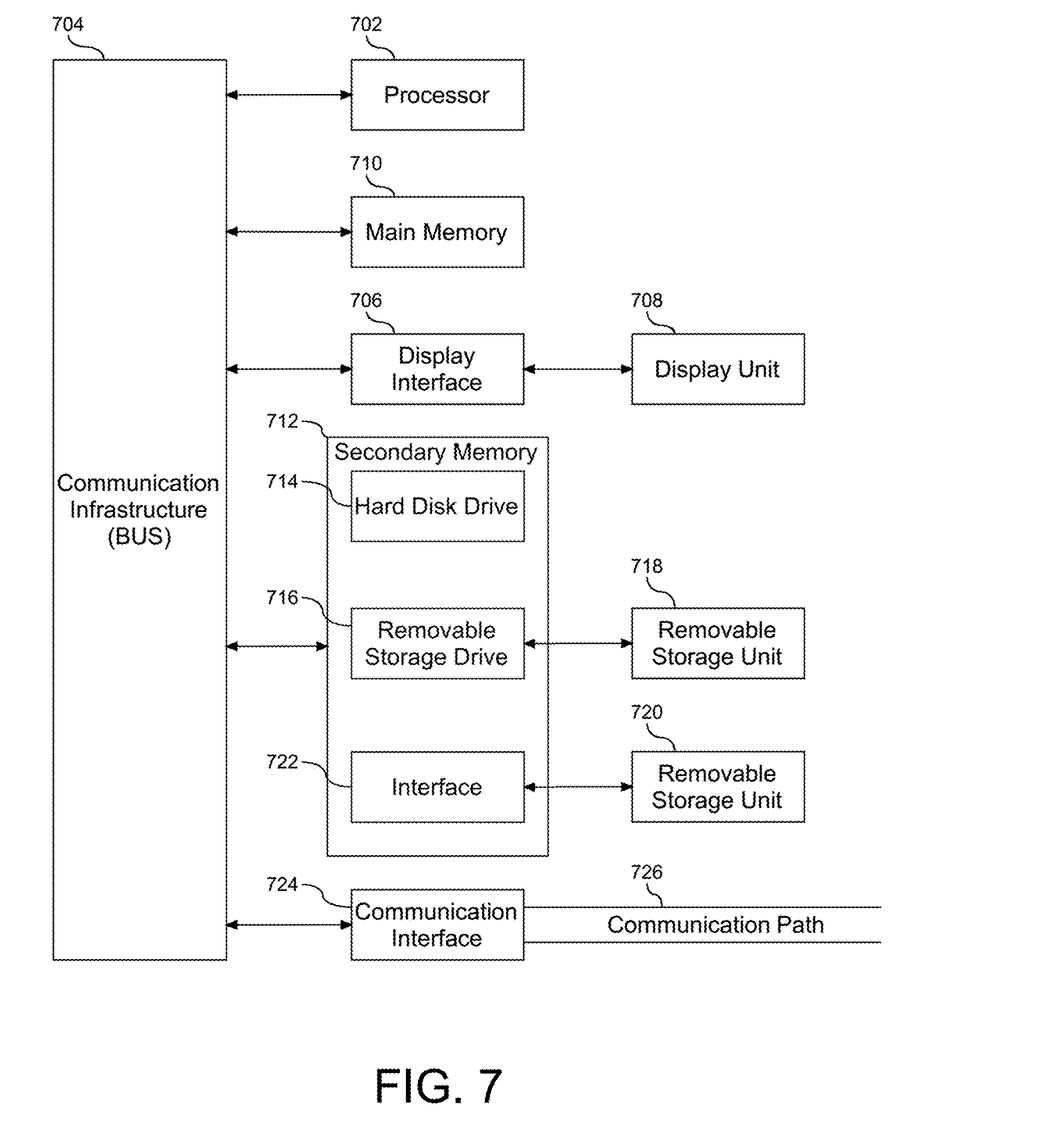
FIG. 7 is a block diagram showing a system for implementing an embodiment of the present invention.

Referring now to the block diagram of FIG. 7, additional details are now described with respect to implementing an embodiment of the present invention. The computer system includes one or more processors, such as a processor (702). The processor (702) is connected to a communication infrastructure (704) (e.g., a communications bus, cross-over bar, or network).

The computer system can include a display interface (706) that forwards graphics, text, and other data from the communication infrastructure (704) (or from a frame buffer not shown) for display on a display unit (708). The computer system also includes a main memory (710), preferably random access memory (RAM), and may also include a secondary memory (712). The secondary memory (712) may include, for example, a hard disk drive (714) and/or a removable storage drive (716), representing, for example, a floppy disk drive, a magnetic tape drive, or an optical disk drive. The removable storage drive (716) reads from and/or writes to a removable storage unit (718) in a manner well known to those having ordinary skill in the art. Removable storage unit (718) represents, for example, a floppy disk, a compact disc, a magnetic tape, or an optical disk, etc., which is read by and written to by removable storage drive (716). As will be appreciated, the removable storage unit (718) includes a computer readable medium having stored therein computer software and/or data.

In alternative embodiments, the secondary memory (712) may include other similar means for allowing computer programs or other instructions to be loaded into the computer system. Such means may include, for example, a removable storage unit (720) and an interface (722). Examples of such means may include a program package and package interface (such as that found in video game devices), a removable memory chip (such as an EPROM, or PROM) and associated socket, and other removable storage units (720) and interfaces (722) which allow software and data to be transferred from the removable storage unit (720) to the computer system.

The computer system may also include a communications interface (724). Communications interface (724) allows software and data to be transferred between the computer system and external devices. Examples of communications interface (724) may include a modem, a network interface (such as an Ethernet card), a communications port, or a PCMCIA slot and card, etc. Software and data transferred via communications interface (724) are in the form of signals which may be, for example, electronic, electromagnetic, optical, or other signals capable of being received by communications interface (724). These signals are provided to communications interface (724) via a communications path (i.e., channel) (726). This communications path (726) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (710) and secondary memory (712), removable storage drive (716), and a hard disk installed in hard disk drive (714).

Computer programs (also called computer control logic) are stored in main memory (710) and/or secondary memory (712). Computer programs may also be received via a communication interface (724). Such computer programs, when run, enable the computer system to perform the features of the present invention as discussed herein. In particular, the computer programs, when run, enable the processor (702) to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Alternative Embodiment

It will be appreciated that, although specific embodiments of the invention have been described herein for purposes of illustration, various modifications may be made without departing from the spirit and scope of the invention. In one embodiment, the indicia for the paper level may be placed on a side section of the paper supply, such as a ream or roll, as not to affect the surface of the paper that is presentable. Accordingly, the scope of protection of this invention is limited only by the following claims and their equivalents.

We claim:

1. A system comprising:
a processing unit in communication with memory;
a sensor in communication with the memory, the sensor to read a position of indicia on a paper supply, the indicia comprising two lines, including a first line starting from a first corner at a first end of the paper supply and a second line starting from an oppositely positioned second corner at the first end of the paper supply, wherein the first and second lines converge to meet at a common point at a second end of the paper supply; and
a position manager in communication with the sensor, the position manager to measure a distance between a first point on the first line and a second point on the second line on the paper supply, receive the position of the indicia from the sensor and assess a measurement of the paper supply, the assessment including the position manager to calculate a remaining length of paper supply based on the measured distance between the first and the second points; and
a director in communication with the position manager, the director to dispense paper from the paper supply based on the paper supply measurement assessed by the position manager.

2. The system of claim 1, further comprising a threshold manager in communication with the position manager and the director, the threshold manager to compare the measurement of the paper against a defined threshold, and to communicate the compared measurement to the director.

3. The system of claim 2, further comprising the director to communicate a signal to a printing device in communication with the paper supply, the signal to provide an authorization selected from the group consisting of: print of a successive print job with the paper supply, and replacement of the paper supply.

4. The system of claim 1, wherein the measurement is selected from the group consisting of: remaining length of paper supply and consumed length of paper supply.

5. The system of claim 1, wherein the indicia is comprised of a material selected from the group consisting of: magnetic ink, infra-red sensitive ink, and ultra violet sensitive ink.

6. The system of claim 1, wherein the remaining length of paper supply calculation comprises an indication of a level of a non-dispensed portion of the paper supply.

7. The system of claim 1, wherein the indicia is composed of visible ink, and wherein the position of the indicia is visually observable.

* * * * *